US010826679B2

(12) United States Patent
Jablonski et al.

(10) Patent No.: US 10,826,679 B2
(45) Date of Patent: Nov. 3, 2020

(54) ENCRYPTING AND DECRYPTING UNIT FOR RSA CRYPTOGRAPHIC SYSTEM, RESISTANT TO FAULTS INJECTION

(71) Applicant: ADIPS SPOLKA Z OGRANICZONA ODPOWIEDZIALNOSCIA, Zielona Gora (PL)

(72) Inventors: Janusz Jablonski, Zielona Gora (PL); Witold Wendrowski, Zielona Gora (PL)

(73) Assignee: ADIPS SPOLKA Z OGRANICZONA ODPOWIEDZIALNOSCIA, Zielona Gora (PL)

( * ) Notice: Subject to any disclaimer, the term of this patent is extended or adjusted under 35 U.S.C. 154(b) by 0 days.

(21) Appl. No.: 16/391,928

(22) Filed: Apr. 23, 2019

(65) Prior Publication Data

US 2019/0327074 A1    Oct. 24, 2019

(30) Foreign Application Priority Data

Apr. 23, 2018    (PL) .......................................... 425306

(51) Int. Cl.
*H04L 9/00*    (2006.01)
*G06F 7/72*    (2006.01)

(52) U.S. Cl.
CPC .............. *H04L 9/004* (2013.01); *G06F 7/723* (2013.01); *G06F 2207/7219* (2013.01); *H04L 2209/12* (2013.01)

(58) Field of Classification Search
CPC ..... H04L 9/004; H04L 9/302; H04L 2209/12; G06F 2207/7219; G06F 7/723

(Continued)

(56) References Cited

U.S. PATENT DOCUMENTS

| 6,397,241 B1 * | 5/2002 | Glaser ..................... G06F 7/722 |
| | | 708/625 |
| 6,937,728 B1 * | 8/2005 | Abe ........................ H04L 9/085 |
| | | 380/237 |

(Continued)

OTHER PUBLICATIONS

M. Ciet, et al., "Parallel FPGA Implementation of RSA with Residue Number System—Can side-channel threats be avoided?—Extended Version", International Association for Cryptologic Research, Aug. 5, 2004, pp. 1-16, vol. 20040807: 043814, XP 061000912.

(Continued)

*Primary Examiner* — Khalil Naghdali
(74) *Attorney, Agent, or Firm* — Buchanan Ingersoll & Rooney PC

(57) ABSTRACT

A digital encrypting and decrypting unit (PMEU) that operates according to a Rivest-Shamir-Adleman (RSA) cryptosystem based on Residue Numeral System (RNS) and Chinese Reminder Theorem (CRT). The unit includes two modular exponentiation calculating units (MES-1, MES-2) to process a two residual signals (X mod p; X mod q) to calculate a result of a modular exponentiation by a binary method. The calculating units have inputs (I-k[i], I-SM, I-MM) and outputs (O-k[i], O-SM, O-MM) for signals representing partial results of the modular exponentiation. A modular exponentiation controlling unit (MECU) is connected to the inputs and outputs of the calculating units to control flow of the signals representing the partial results of the modular exponentiation.

1 Claim, 5 Drawing Sheets

(58) Field of Classification Search
USPC .......................................................... 713/189
See application file for complete search history.

(56) References Cited

U.S. PATENT DOCUMENTS

| | | | | |
|---|---|---|---|---|
| 2005/0185791 A1* | 8/2005 | Chen | ................. | G06F 7/723 |
| | | | | 380/30 |
| 2005/0188209 A1* | 8/2005 | Chen | ................. | G06F 7/723 |
| | | | | 713/183 |
| 2011/0231465 A1* | 9/2011 | Phatak | ................ | G06F 7/729 |
| | | | | 708/235 |

OTHER PUBLICATIONS

H. Nozaki, et al., "Implementation of RSA Algorithm Based on RNS Montgomery Multiplication", Cryptographic Hardware and Embedded Systems, 2001, pp. 364-376, vol. 2162, XP 001061175.
A. Fournaris, et al., "CRT RSA Hardware Architecture with Fault and Simple Power Attack Countermeasures", Digital System Design (DSD), Sep. 5, 2012, pp. 661-667, XP 032293790.
M. Ciet, et al., "Practical Fault Countermeasures for Chinese Remaindering Based RSA (Extended Abstract)", Fault Diagnosis and Tolerance in Cryptography, Sep. 2, 2005, pp. 121-131, XP 007906966.
A. Menezes, et al., "Handbook of Applied Cryptography", CRC Press, Oct. 1996, Chapter 14, ISBN: 0-8493-8523-7 (45 pages).
The extended European Search Report dated Aug. 14, 2019, by the European Patent Office in corresponding European Application No. 19170448.5. (6 pages).

* cited by examiner

ENCRYPTING AND DECRYPTING UNIT FOR RSA CRYPTOGRAPHIC SYSTEM, RESISTANT TO FAULTS INJECTION

TECHNICAL FIELD

The present disclosure relates to a digital encrypting and decrypting unit for an RSA cryptographic system, being resistant to faults injection.

BACKGROUND OF THE INVENTION

Secrecy of cryptographic keys is essential for cryptographic safety. Typical personalized and most commonly used devices for conducting cryptographic operations are simple chip cards and payment cards, which perform hardware encryption of information. It should be emphasized, that work is currently underway on secure solutions such as an electronic identity document (ID) with a digital layer, but also on other systems that use e-Identity.

There is a need to provide, for such devices, safe and computationally and energetically effective solutions for authorization, encryption and decryption of data.

RSA (Rivest-Shamir-Adleman) is a public-key cryptosystem that is widely used for secure data transmission and authentication. In this type of cryptosystem, the encryption key is public and it is different from the decryption key which is kept secret (private). In RSA, this asymmetry is based on the practical difficulty of the factorization of the product of two large prime numbers, the "factoring problem".

CRT (Chinese reminder theorem) is a theorem of number theory, which states that if one knows the remainders of the Euclidean division of an integer n by several integers, then one can determine uniquely the remainder of the division of n by the product of these integers, under the condition that the divisors are pairwise coprime.

RNS (Residue Numeral System) is a numeral system representing integers by their values modulo several pairwise coprime integers called the moduli. This representation is allowed by the Chinese remainder theorem, which asserts that, if N is the product of the moduli, there is, in an interval of length N, exactly one integer having any given set of modular values. The arithmetic of a residue numeral system is also called multi-modular arithmetic.

A fault injection attack is a procedure to introduce an error in a computing device in order to alter the software execution. It is aimed to avoid the execution of an instruction and corrupt the data which is processed by the processor. Such attack is used to compromise the security of embedded devices by bypassing security checks or leaking the private keys. There are many types of fault injection attacks, such as clock and voltage glitching, optical glitching, electromagnetic glitching, heat glitching or radiation glitching.

Prior art solutions related to RSA cryptographic systems are disadvantageous due to redundancy of circuitry, prolongation of the processing process and increased power consumption, wherein they do not eliminate completely the possibility of occurrence of errors in calculations, because it is possible to introduce an interference also in redundant calculations which verify the results.

SUMMARY OF THE INVENTION

There is a need to provide an RSA encoder and decoder unit, which will solve at least some of the disadvantages of the known systems.

The encrypting and decrypting unit for an RSA cryptographic system as presented herein is based on residue number system (RNS) and Chinese reminder theorem (CRT), wherein the unit uses two residual channels for processing data. The unit comprises two parallel modular exponentiation calculating units (called shortly calculating units) and a modular exponentiation controlling unit (called shortly a controlling unit) that controls the flow of signals representing two streams of data. The modular exponentiation controlling unit is connected between the two modular exponentiation calculating units.

The encrypting and decrypting unit performs modular exponentiation on nonnegative integer numbers according to the formula $Z = X^K \mod N$, used in systems which are dedicated to hide information, a digital signature and is used in authentication. Apart from two standard parallel modular exponentiation calculating units, an additional modular exponentiation controlling unit is used for controlling the flow of signals representing two streams of data and alternately directing the selected signals to both calculating units. Depending on the meaning of X and K input data, Z represents a ciphertext or a massage to be ciphered.

Preferably, the signals representing two streams of data are switched cyclically between the two calculating units operating in parallel, in synchronization with a clock signal.

Preferably, the controlling unit comprises six inputs. Three inputs are connected to three outputs of the first calculating unit, and the remaining three inputs are connected to three outputs of the second calculating unit. The controlling unit further comprises six outputs, three of which are connected to three inputs of the first calculating unit, and the remaining three are connected to three inputs of the second calculating unit.

Preferably, the inputs of the controlling unit are connected correspondingly with the outputs of both calculating units, and the outputs of the controlling unit are connected correspondingly with the inputs of both calculating units, to allow switching the signals representing data obtained in current iteration of calculations in one of the calculating units to the second calculating unit, such that the signals representing output data are switched (toggled) multiple times between the calculating units operating in parallel, wherein the switching is conducted with high frequency (preferably, not lower than 1 MHz). Consequently, erroneous operation of only one calculating unit for a time longer than one microsecond gives an advantageous effect of interfering both signals representing both streams of data. Current state of the art does not provide methods for selectively impairing the semiconductor structures for such short period of time. Thus, the implementation of the system according to the description makes the RSA encrypting and decrypting unit with RNS and CRT much more resistant against the possibility of performing the cryptanalysis based on fault injection.

Preferably, the controlling unit comprises six switching elements. These switching elements may have a form of multiplexers, wherein the inputs of the first three multiplexers are connected to the three outputs of the first calculating unit and the inputs of the remaining three multiplexers are connected to the three outputs of the second calculating unit. The first three multiplexers are simultaneously controlled by the level of a cyclically variable clock signal, wherein the remaining three multiplexers are controlled by the opposite level of that clock signal, and each of the first three multiplexers has the output connected correspondingly with one of the three inputs of the first calculating unit, and each of the remaining three multiplexers has the output connected correspondingly to one of the three inputs of the second calculating unit. Consequently, when the control signals of the first three multiplexers activate the connection of the three outputs of the first calculating unit to the three inputs of the first calculating unit, then the three outputs of the second calculating unit are being connected correspondingly to three inputs of the second calculating unit, wherein when the control signal changes the level into the opposite level then the control signals of the first three multiplexers engage the connection of the three outputs of the first calculating unit, and the three outputs of the second calculating unit are being connected adequately to the three inputs of the first calculating unit.

Preferably, the clock signal is directly connected to the control inputs of the three multiplexers, wherein the control input of the remaining three multiplexers is connected to the clock signal through a negation element (NOT), changing the logical level into opposite level.

The present invention eliminates negative effects of fault injection to the digital system and therefore provides useful, specific and real result.

The present invention may be implemented in cryptographic systems aimed at encrypting and decrypting data, therefore the machine and transformation test is fulfilled, and the presented idea is not abstract. The present invention, compared to currently available solutions, provides energy saving and resources usage for manufacturing and recycling of the unit, thus it is advantageous from an economic and ecologic point of view.

These and other features, aspects and advantages of the invention will become better understood with reference to the following drawings, descriptions and claims.

BRIEF DESCRIPTION OF DRAWINGS

Further details and features of the presented invention, its nature and advantages will become clear from the following description of the preferred embodiments presented in the drawings wherein.

NOTATION AND NOMENCLATURE

Figure 1:
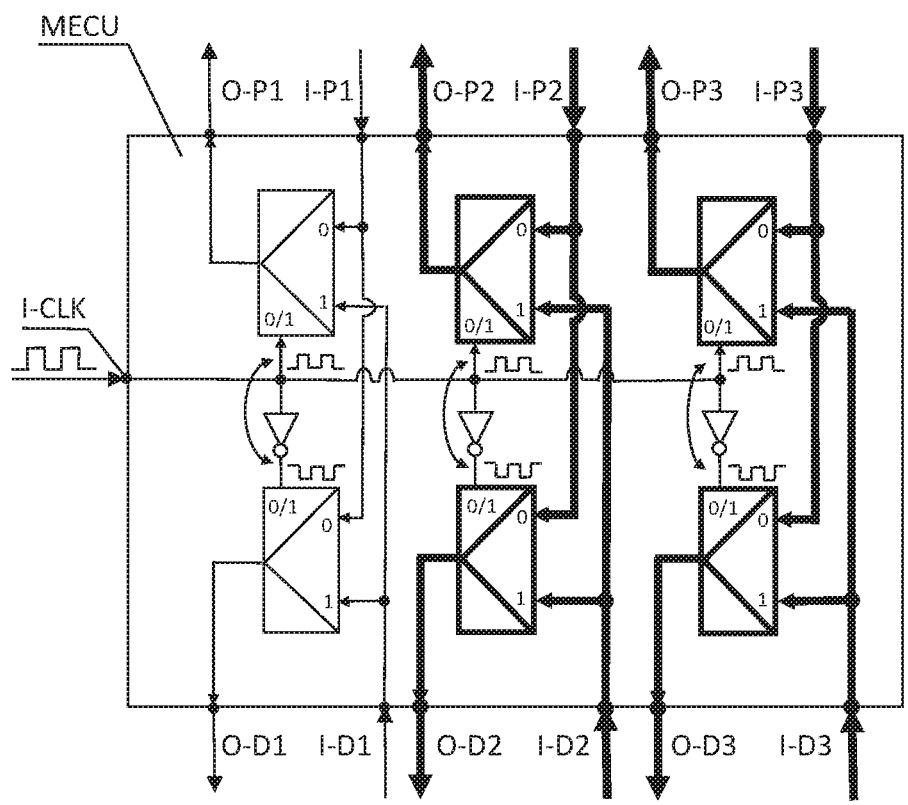
FIG. 1 presents a block diagram of an example embodiment of a controlling unit.

In the meaning of the present description, the term "example" means a non-limiting example, embodiment or drawing. In the meaning of the present description the term "for example", "exemplary" present a list of one or more non-limiting examples, instances or drawings.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention.

The presented embodiments of the present invention will be described with reference to the drawings, on which the same elements and structures are depicted by means of the same indications.

The signals depicted in the drawings as lines refer to single or multibit signal lines.

Figure 3:
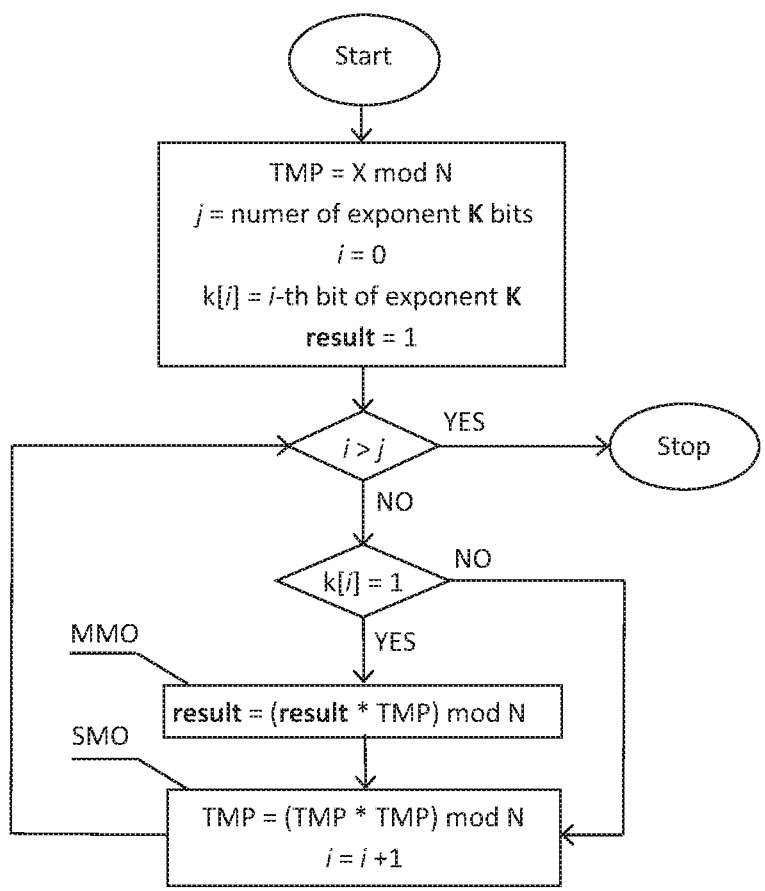
FIG. 3 presents a block diagram of the modular exponentiation algorithm using the binary method based on mathematical modular exponentiation formula.
Figure 4:
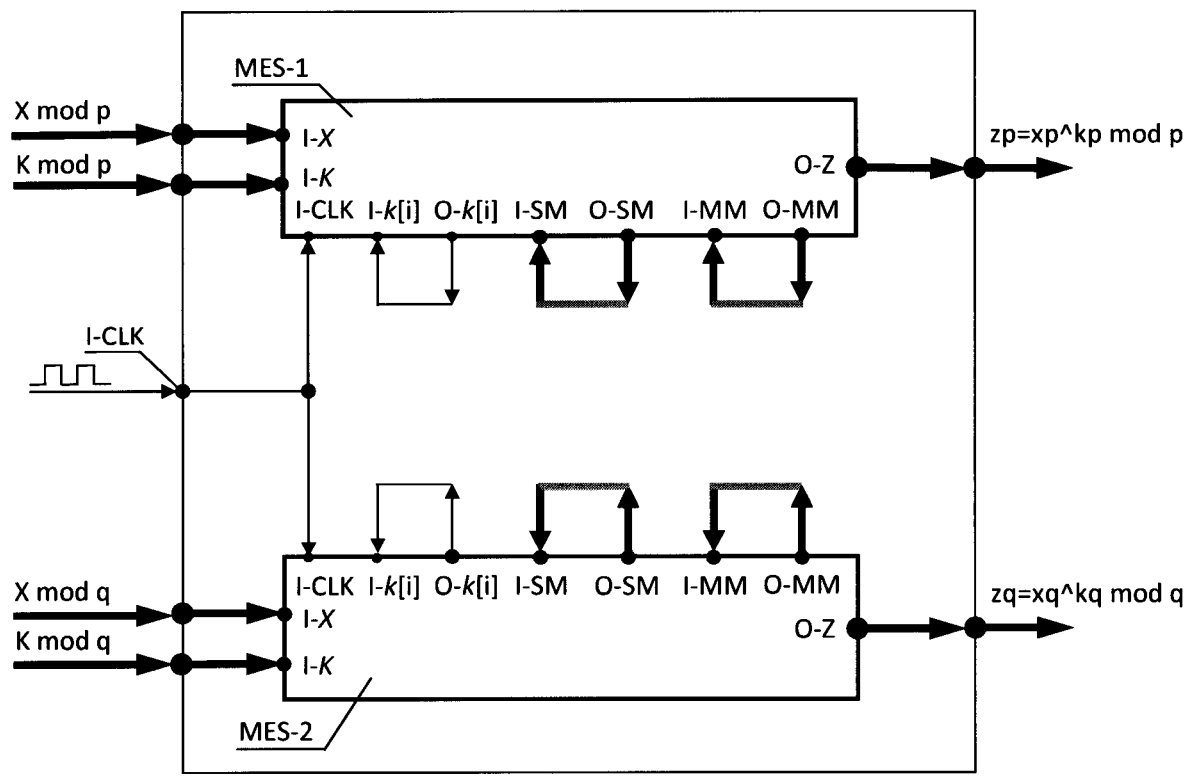
FIG. 4 presents a block diagram of a prior art digital parallel modular exponentiation system.

Usually, for the needs of RSA encrypting and decrypting with the use of RNS and CRT, the modular exponentiation is performed in parallel, as depicted on the block diagram in FIG. 4, wherein input data to be encrypted or decrypted are signals representing residuals X mod p and X mod q, wherein output data $zp=xp^{\wedge}kp$ mod p and $zq=xq^{\wedge}kq$ mod q, are used for generating the result of encryption or decryption Z=CRT(zp, zq) on the basis of modular exponentiation results determined in the modular exponentiation calculating units MES-1 and MES-2 (wherein CRT is a Chinese reminder theorem function). The system of FIG. 4 is configured for performing parallel calculations of results in two residual channels modulo p and modulo q of the RNS system using a classical method, wherein the levels of signals representing partial data are determined sequentially in loops or iterations depicted in FIGS. 2 and 3 as the iteration loop of calculating a square of the modulo SMO and the iteration loop of modulo multiplying MMO, wherein on the basis of the results of residual representation Z={zp, zq} from the value $zp=xp^{\wedge}kp$ mod p and $zq=xq^{\wedge}kq$ mod q a final result is determined Z=CRT(zp, zq), wherein xp=X mod p, xq=X mod q, kp=K mod p and kq=K mod q, where X is the base of the modular exponentiation, K is the exponent of the modular exponentiation and the modulus are factors p and q of the modulus N=p*q.

In the system shown in FIG. 4, if a correct cipher data is designated as Z=CRT(zp, zq) and cipher data generated with fault injected to one of the processing channels is designated as Z'=CRT(z'p, zq), then once a fault is injected to the channel that designates the value of z'p, the resulting value calculated as a difference Z−Z'=+/−kq is a multiple of a prime number q, therefore GCD(Z−Z', N)=q (wherein GCD stands for Greatest Common Divisor). Similarly, if a fault is related to the calculated z'q then Z−Z'=+/−kp and GCD(Z−Z', N)=p. Therefore, by knowing one of the factors (p or q) of the product N, the second factor (q or p, respectively) can be easily determined. Similarly, the product (p−1)*(q−1) can be easily determined and so the value of the private key, which may lead to breaking the cryptographic system.

Figure 5:
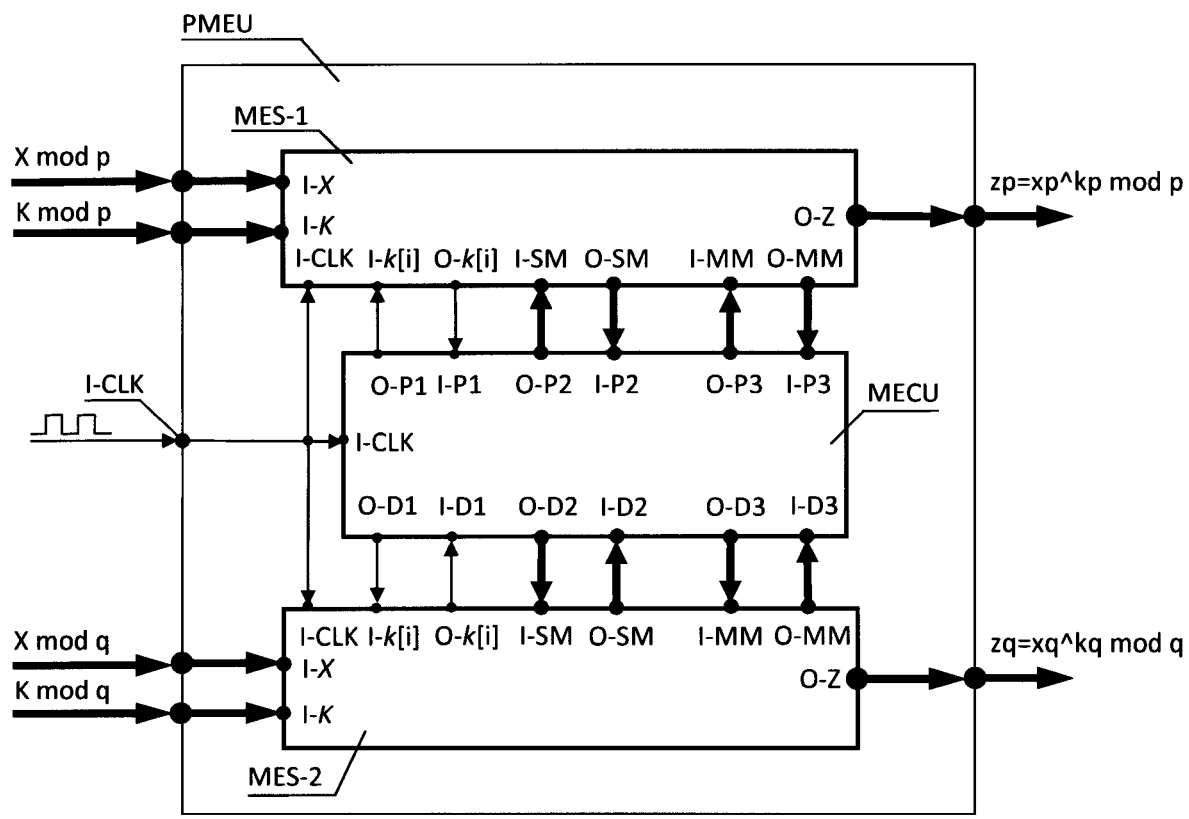
FIG. 5 presents a block diagram of an example embodiment of a digital parallel modular exponentiation unit (PMEU) for digital encrypting and decrypting according to the invention.

According to the present invention, the system of FIG. 4 is modified by adding a modular exponentiation controlling unit (MECU) that is implemented between the calculating units MES-1 and MES-2, as shown in FIG. 5.

FIG. 5 presents a block diagram of an example embodiment of use of the parallel modular exponentiation unit PMEU comprising two calculating units MES-1 and MES-2 operating in parallel and the controlling unit MECU, connected between their signal terminals, for operating the modular exponentiation switching the signals representing the partial results of the modular exponentiation, respectively between the calculating units MES-1 and MES-2 and in synchronization to clock signal CLK levels (wherein the clock signal CLK is connected to the I-CLK input). The digital parallel modular exponentiation unit PMEU may be used both as data encoder and decoder.

Figure 2:
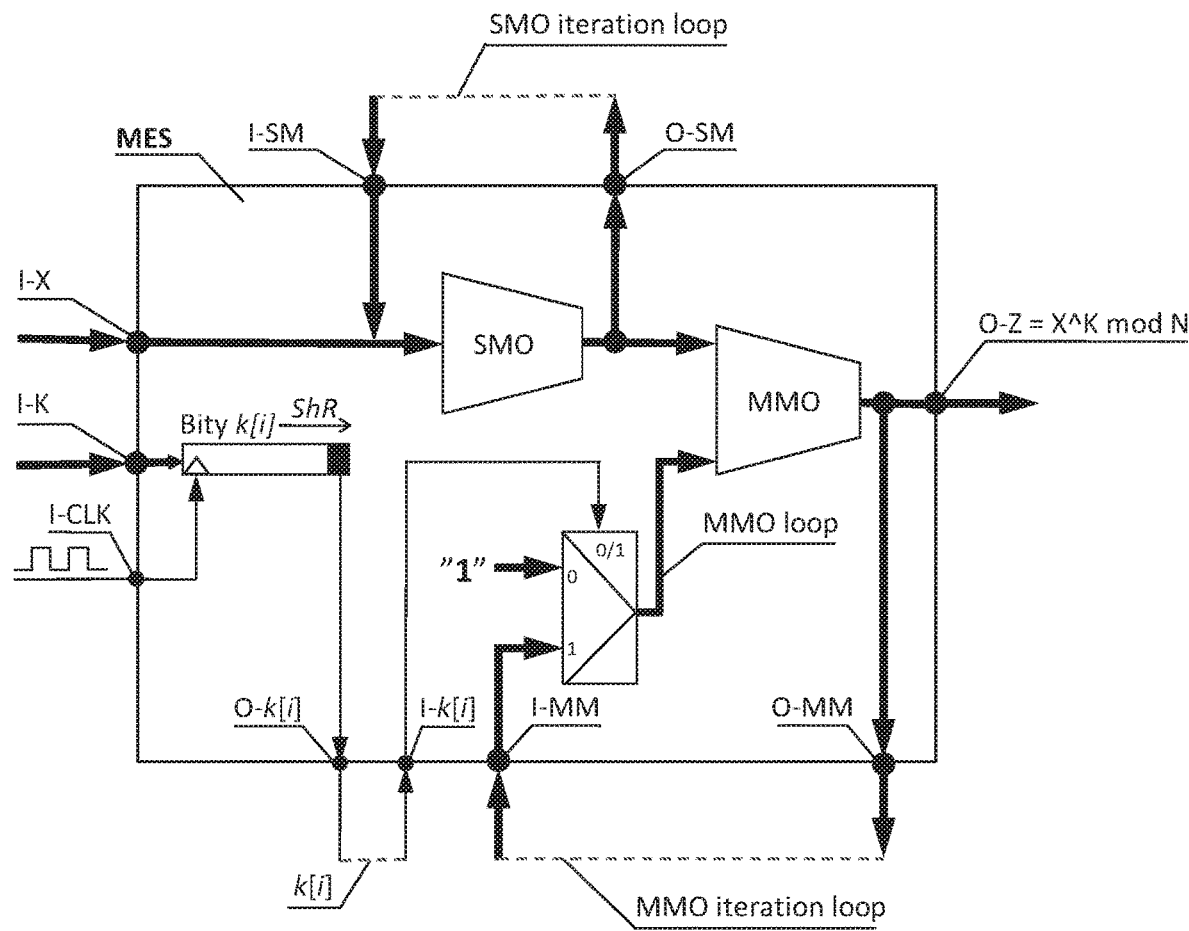
FIG. 2 presents a block diagram of an example embodiment of a modular exponentiation system (MES) for performing the modular exponentiation according to a modular exponentiation algorithm using a binary method presented in FIG. 3.

According to the embodiment of FIG. 5, the modular exponentiation controlling unit MECU is implemented in between two identical parallel modular exponentiation calculating units MES-1 and MES-2, the structure MES of which is shown in FIG. 2. The modular exponentiation calculating units MES are configured to calculate the results of modular exponentiation by a binary method on modulos p or q. The MES units comprise elements for calculating a square of the modulo (SMO) and elements for performing modulo multiplying operation (MMO) that operate if the current bit of an exponent is equal to "1". The MES units operate according to the modular exponentiation algorithm using the binary method, as shown in FIG. 3. The data inputs to the MES of FIG. 2, depicted as I-X, I-K and I-CLK, represent respectively data signal inputs of a base of the modular exponentiation X, the signal inputs of an exponent of the modular exponentiation K and an input of a clock signal CLK, which activates a bit shift of the exponent. The MES unit has the following signal inputs and outputs that represent internal calculation results:

O-Z is an output of the result Z=X^K mod N after performing all iterations and operations calculating a square of the modulo (SMO), and conditional multiplication of the modulo (MMO) for each iteration, I-SM and O-SM are an input and an output of the SMO element, wherein the output O-SM is directed by means of the controlling unit MECU to the input I-SM of one of the MES units, depending on the CLK signal level, I-MM and O-MM are an input and an output of the MMO element, wherein the output O-MM is directed by means of the controlling unit MECU to the input I-MM of one of the MES units, depending on the CLK signal level, I-k[i] and O-k[i] are an input and an output of a control signal, being a current bit of the exponent k[i], wherein the output O-k[i] is directed by means of the controlling unit MECU to the input I-k[i] of one of the MES units, depending on the level of the CLK signal.

The consecutive iteration is executed, when the CLK signal changes its state.

As shown in FIG. 1, the controlling unit (MECU) comprises six multiplexers divided into two symmetrical groups—each group comprising three multiplexers, and three negating gates (NOT) having their outputs connected adequately to control inputs of the second group of multiplexers, wherein all multiplexers are controlled by the clock signal (CLK) in such a way, that the multiplexers of the first group receive directly the clock signal at their control inputs, while the multiplexers of the second group receive at the same time the clock signal which is reversed by the negating gates, which as a result allows cyclical switching of the inputs and the outputs of a controlling unit, defined as push-pull. Preferably the outputs of the signals representing partial data obtained in the calculating units MES-1 and MES-2, are connected to inputs of the controlling unit MECU. The input signals of the MECU unit depicted as I-P1, I-P2, I-P3 are respectively connected to the outputs O-k[i], O-SM, O-MM of the first calculating unit MES-1, and the output signals from the MECU unit depicted as O-P1, O-P2, O-P3 are connected to the inputs I-k[i], I-SM, I-MM of the first calculating unit MES-1. Similarly, the input signals of the MECU unit depicted as I-D1, I-D2, I-D3 are connected respectively to the outputs O-k[i], O-SM, O-MM of the second calculating unit MES-2 and the output signals from the MECU unit depicted as O-D1, O-D2, O-D3 are connected respectively to the inputs I-k[i], I-SM, I-MM of the MES-2 unit. The input terminal I-CLK of all units in FIG. 5 is connected to the CLK signal. When the level of the CLK signal is high, then the signals from the outputs O-k[i], O-SM, O-MM of the second calculating unit MES-2 are transmitted respectively to the inputs I-k[i], I-SM, I-MM of the first calculating unit MES-1 and simultaneously the signals from the outputs O-k[i], O-SM, O-MM of the first calculating unit MES-1 are transmitted respectively to the inputs I-k[i], I-SM, I-MM of the second calculating unit MES-2. When the level of the CLK signal is low, then the signals from the outputs O-k[i], O-SM, O-MM of the first calculating unit MES-1 are transmitted respectively to the inputs I-k[i], I-SM, I-MM of the first calculating unit MES-1 and simultaneously the signals from the outputs O-k[i], O-SM, O-MM of the second calculating unit MES-2 are transmitted respectively to the inputs I-k[i], I-SM, I-MM of the second calculating unit MES-2.

The switching of the signals is performed in the controlling unit MECU in FIG. 1 which is connected between the signal terminals of the calculating units MES-1 and MES-2 accordingly to the scheme on FIG. 5, which presents the parallel modular exponentiation unit PMEU with indications of signal input and output connecting terminals, corresponding to the embodiment.

FIG. 3 presents a block diagram of the modular exponentiation algorithm using the binary method based on mathematical modular exponentiation formula. This formula is known from literature (for example: Handbook of applied cryptography, CRC Press, ISBN: 0-8493-8523-7, October 1996). The algorithm is presented in order to show that the algorithm is iterative and comprises: modular multiplication operation denoted as MMO and consecutive operations of calculating a square of the modulo operation denoted as SMO.

Although the invention is presented in the drawings and the description and in relation to its preferred embodiments, these embodiments do not restrict nor limit the presented invention. It is therefore evident that changes, which come within the meaning and range of equivalency of the essence of the invention, may be made. The presented embodiments are therefore to be considered in all aspects as illustrative and not restrictive. According to the abovementioned, the scope of the invention is not restricted to the presented embodiments but is indicated by the appended claims.

We claim:

1. A digital encrypting and decrypting device operating according to a Rivest-Shamir-Adleman (RSA) cryptosystem based on Residue Numeral System (RNS) and Chinese Reminder Theorem (CRT), comprising:

A hardware processor comprising:
a first modular exponentiation calculating unit configured to process a first residual signal to calculate a result of a modular exponentiation by a binary method;
a second modular exponentiation calculating unit configured to process a second residual signal to calculate a result of a modular exponentiation by a binary method;
wherein the first modular exponentiation calculating unit and the second modular exponentiation calculating unit have inputs and outputs for signals representing partial results of the modular exponentiation;
a modular exponentiation controlling unit comprising at least one switching element connected to the inputs and outputs of the first modular exponentiation calculating unit and to the inputs and outputs of the second modular exponentiation calculating unit to control flow of the signals representing the partial results of the modular exponentiation according to a clock signal, by:

when the clock signal has a first level, directing the signals representing the partial results of the modular exponentiation from the outputs of the first modular exponentiation calculating unit to the inputs of the second modular exponentiation calculating unit and directing the signals representing the partial results of the modular exponentiation from the outputs of the second modular exponentiation calculating unit to the inputs of the first modular exponentiation calculating unit; and when the clock signal has a second level, directing the signals representing the partial results of the modular exponentiation from the outputs of the first modular exponentiation calculating unit to the inputs of the first modular exponentiation calculating unit and directing the signals representing the partial results of the modular exponentiation from the outputs of the second modular exponentiation calculating unit to the inputs of the second modular exponentiation calculating unit; and wherein the modular exponentiation controlling unit is implemented in between two identical parallel modular exponentiation calculating units, wherein the modular exponentiation controlling unit eliminates completely the possibility of performing the cryptanalysis based on fault injection into one of the two modular exponentiation calculating units by high frequency switching signals representing two streams of data being transferred between these two modular exponentiation calculating units.

* * * * *